US005788827A

United States Patent [19]

Munson

[11] Patent Number: 5,788,827

[45] Date of Patent: Aug. 4, 1998

[54] MEANS AND METHOD FOR REMOVING PARTICULATE MATTER FROM NONCONDUCTIVE LIQUIDS

[75] Inventor: Gerald L. Munson, Madison, Conn.

[73] Assignee: M.A.G. Systems, Inc., Norwich, Conn.

[21] Appl. No.: 797,133

[22] Filed: Feb. 10, 1997

[51] Int. Cl.$^6$ .......... B01D 35/00

[52] U.S. Cl. .......... 204/555; 204/560; 204/571; 204/661; 204/665; 209/127.1

[58] Field of Search .......... 204/555, 560, 204/571, 661, 665; 209/127.1

[56] References Cited

U.S. PATENT DOCUMENTS

| | | | |
|---|---|---|---|
| 3,893,898 | 7/1975 | Candor | 204/571 |
| 4,400,253 | 8/1983 | Prestridge et al. | 204/186 |
| 4,467,529 | 8/1984 | Candor | 34/1 |
| 4,514,272 | 4/1985 | Dubreuil et al. | 204/186 |
| 4,579,637 | 4/1986 | Jaisinghani et al. | 204/571 |
| 4,594,138 | 6/1986 | Thompson | 204/302 |
| 4,606,801 | 8/1986 | Prestridge et al. | 204/186 |
| 4,618,432 | 10/1986 | Mintz et al. | 210/748 |
| 4,744,910 | 5/1988 | Bossard | 210/748 |
| 5,066,504 | 11/1991 | Asbeck et al. | 426/417 |
| 5,069,768 | 12/1991 | Plaas-Link | 204/180.1 |
| 5,139,675 | 8/1992 | Arnold et al. | 210/636 |
| 5,234,555 | 8/1993 | Ibbott | 204/150 |
| 5,256,270 | 10/1993 | Tokumoto | 204/302 |
| 5,332,485 | 7/1994 | Thompson | 204/302 |
| 5,352,347 | 10/1994 | Reichert | 204/302 |

*Primary Examiner*—Arun S. Phasge
*Attorney, Agent, or Firm*—John H. Crozier

[57] ABSTRACT

In a preferred embodiment, an apparatus for removing particles from a nonconductive liquid, including: first sensing apparatus to sense a first net electrostatic charge on the particles in the liquid and to provide a first output signal indicative of the first net electrostatic charge; control and power apparatus to receive the first output signal; charging apparatus connected to the control and power apparatus to provide positive and negative electrostatic charging potentials to the particles; mixing apparatus connected to the charging apparatus to receive the liquid therefrom and to permit oppositely charged and noncharged ones of the particles to flocculate; and separating apparatus to remove flocculated particles from the liquid.

18 Claims, 8 Drawing Sheets

| Particle Size | 0.1-1u | 1-5u | 5-15u | 15-20u | 20-50u | >50u | total>5u | total>15u | total all sizes | ISO CODE |
|---|---|---|---|---|---|---|---|---|---|---|
| Time t=0 | 883,740 | 582,980 | 302,820 | 201,880 | 74,160 | 14,420 | 593,280 | 290,460 | 2,060,000 | 23/22 |
| Time t=2 | 68,238 | 20,400 | 6,936 | 3,468 | 2,958 | 1 | 13,363 | 6,427 | 102,000 | 21/20 |
| Time t=10 | 38,962 | 12,403 | 6,353 | 2,178 | 303 | 303 | 9,136 | 2,783 | 60,500 | 20/19 |
| Time t=60 | 2,336 | 267 | 73 | 30 | 14 | 1 | 118 | 44 | 2,720 | 14/13 |
| Time t=120 | 680 | 75 | 42 | 8 | 2 | 0 | 52 | 10 | 807 | 13/11 |
| Time t=240 | 320 | 15 | 8 | 2 | 0 | 0 | 10 | 2 | 346 | 11/08 |

FIG. 4

| Application/Size | 500USG | 1,000USG | 2,000USG | 5,000USG |
|---|---|---|---|---|
| | | | | |
| Insulating Oil | | | X | |
| Hydraulic Light | | X | | |
| Hydraulic Medium | X | | | |
| Hydraulic Heavy | X | | | |
| Diesel Lube SAE 40 | | | X | |
| Diesel Lube SAE 50 | | X | | |
| Gas Turbine Lube | | | X | |
| Steam Turbine Lube | | | | X |

FIG. 7

MEANS AND METHOD FOR REMOVING PARTICULATE MATTER FROM NONCONDUCTIVE LIQUIDS

BACKGROUND OF THE INVENTION

1. Field of the Invention

The present invention relates to the cleaning of liquids generally and, more particularly, but not by way of limitation, to novel means and method for removing particulate matter from nonconductive liquids.

2. Background Art

A typical nonconductive liquid, to the cleaning of which the present invention may be applied, may be an industrial oil such as used for machinery, as an energy transmitter in hydraulic systems, or as an insulator in electrical transformers and other electrical devices. When lubricating and hydraulic oils become contaminated, the particles of dirt, grit, or other solid contaminants cause abrasive wear and fatigue on the machine and, ultimately, machine failure. When electrical oil becomes contaminated, it no longer acts effectively as an insulator in a transformer, for example. Thus, it is the normal practice to "do an oil change" when the oil becomes too contaminated. Old oil is discarded and new oil purchased to replace it.

Parameters which may be affected by contaminated oil include: viscosity, lubricity, thermal capacity, thermal conductivity film strength, surface tension, interfacial tension, pH, bacterial growth rate, optical clarity, optical index of refraction, dielectric constant, dielectric breakdown voltage, resistivity, flash point, boiling point, specific gravity, cloud point, pour point, yield BTU, and many more depending on the liquid.

Waste oil generation in the United States in 1994 amounted to 1.5 billion gallons. Of this, industry generated 550 million gallons—the remaining being automotive related. Disposing of waste oil has had an unfavorable impact on the environment; thus, its disposal is now regulated by Federal, State, and local governments. From an environmental standpoint, waste oil presents a significant problem. It may contain hazardous substances such as heavy metals and toxic organic compounds. In some jurisdictions, waste oil is regulated as a hazardous waste. Disposal of hazardous waste in landfills is becoming increasingly expensive and there is a very limited amount of land available for this purpose. Furthermore, generators of waste oil maintain liability for their oil wastes even after land disposal. In addition, land disposal is environmentally unsound, due to potential soil and water contamination. Accordingly, there is now a significant cost burden placed on industry for disposal of its waste oil. Furthermore, the discarded oil must be replaced with new oil which adds to the cost burden on industry.

In spite of the above, disposal of waste oil is not necessary and most of the oil waste in machinery, if it can be properly cleaned, can be used indefinitely. Keeping oil clean, or providing means to clean it, can save wear and tear on machines, reduce waste oil disposal costs, and reduce costs of acquiring new oil the costs of which are expected to increase. Thus, source reduction is the most environmentally and economically preferred technique for dealing with the waste oil problem.

It is clear that the productivity of capital equipment is directly related to the cleanliness of the liquids used in the equipment. Lubrication and other oils must be maintained as clean as possible to obtain maximum oil and component life. In other words, "the cleaner the better." It is generally recognized that the number of particles larger than five microns in one millimeter of lubricating oil must be kept below 150 to maximize component and lubrication oil life. Particles five microns and smaller have been conclusively shown to be the major cause of abrasive wear and fatigue that leads to component failure, unscheduled downtime, and costly repairs in hydraulic components and bearings.

Thus, adequate regular or continuing liquid purification should extend oil life almost indefinitely, eliminate hazardous waste generation, and reduce or eliminate equipment wear due to contaminants in the oil.

Until recently, attempts to clean contaminated oils relied principally on filtration by mechanical means. Conventional filtration technology is based on the ability to mechanically separate solids from liquids by passing the liquid through a filter strainer or filter media. However, mechanical filters have limitations, a major one of which is the inability to remove, effectively, solid particles in the range of two microns and below.

Insulating liquids which are circulated at a high velocity (typically greater than 5 feet per second) in machinery will, as a rule, develop some type of unbalanced electrostatic charge on the particulate contamination. This particulate exists to some degree in all liquids. This unbalanced charge will: (a) tend to keep all small particles in suspension acting like colloids in an aqueous solution, unless they approach a grounded body and lose the velocity which originally created the charge; and (b) tend to deposit the particulate material near the grounded surface if there is sufficient conductive material near the grounded surface (e.g., moisture or metal particles) to permit the charge on the particles to be discharged.

The major problem with this loosely bound "silt" or "sludge" is that something as subtle as a change in temperature can upset the delicate balance of conductivity to the grounded structure which holds it out of solution, or, conversely, something, such as a lowering of the water content, or an increase in the flow rate, can cause a definitive decrease in the unbalanced charge in the mixture and re-suspend large quantities of this material which may contain particulate in the range of 0.04 to 100 microns in size. This uncontrolled re-suspension can cause catastrophic failure of any type of rotating or reciprocating machinery. If the product in question is a fuel, the atomizing, ignition, and combustion properties can fluctuate wildly causing damage to, or failure of, the equipment.

Most mechanical filtration elements are constructed of non-conductive material which quickly assumes the same charge polarity as the unbalanced charge in the liquid, thereby steering particles away from the small channels which could potentially trap the particles and toward larger openings in the media where the charge is less.

More recently, electrostatic separation technology has gained impetus as a viable means to better perform cleaning of oils. Electrostatic separation technology is based on passing the oil through an electrostatic field created by a high voltage to electrically charge the particulate matter entrained in the oil. This produces an electrostatic reaction whereupon oppositely charged particles flocculate. The resultant flocculated particles are larger in size than the original constituent particles and are more easily captured. A filter media of a selected pore size may be used to capture and retain these flocculated particles. Thus, particulate matter of submicron size may be extracted from waste oil, thereby producing oil with a cleanliness level that is unattainable by present state-of-the-art mechanical filters. An example of a conventional electrostatic filter system is described in U.S. Pat. No. 4,594,138, issued Jun. 10, 1986, to Thompson, and titled FLUID FILTER.

While conventional electrostatic separators offer an improvement over straight mechanical filters, they fail to economically produce liquids of sufficient cleanliness.

Accordingly, it is a principal object of the present invention to provide means and method for removing particulate matter from nonconductive liquids which overcome the disadvantages of conventional cleaning means and methods.

It is a further object of the invention to provide such means and method which result in cleaning such liquids to a degree heretofore not possible.

It is another object of the invention to provide such means which are economical to construct and operate.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, an apparatus for removing particles from a nonconductive liquid, comprising: first sensing means to sense a first net electrostatic charge on said particles in said liquid and to provide a first output signal indicative of said first net electrostatic charge; control and power means to receive said first output signal; charging means connected to said control and power means to provide positive and negative electrostatic charging potentials to said particles; mixing means connected to said charging means to receive said liquid therefrom and to permit oppositely charged and noncharged ones of said particles to flocculate; and separating means to remove flocculated said particles from said liquid. The above is accomplished in a controlled manner so as to eliminate the unbalanced electrostatic charge on the particles in the insulating liquid in the external system to which the apparatus is connected, thereby removing particulate matter from the external system, as well as the liquid circulating therein.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which:

FIGS. 4, 5A, and 5B present results of a laboratory test of the present invention.

FIG. 7 is a table giving system volume that an embodiment of the present invention can maintain in clean condition in operating machinery, as a function of oil type.

DETAILED DESCRIPTION OF THE PREFERRED EMBODIMENTS

Figure 1:
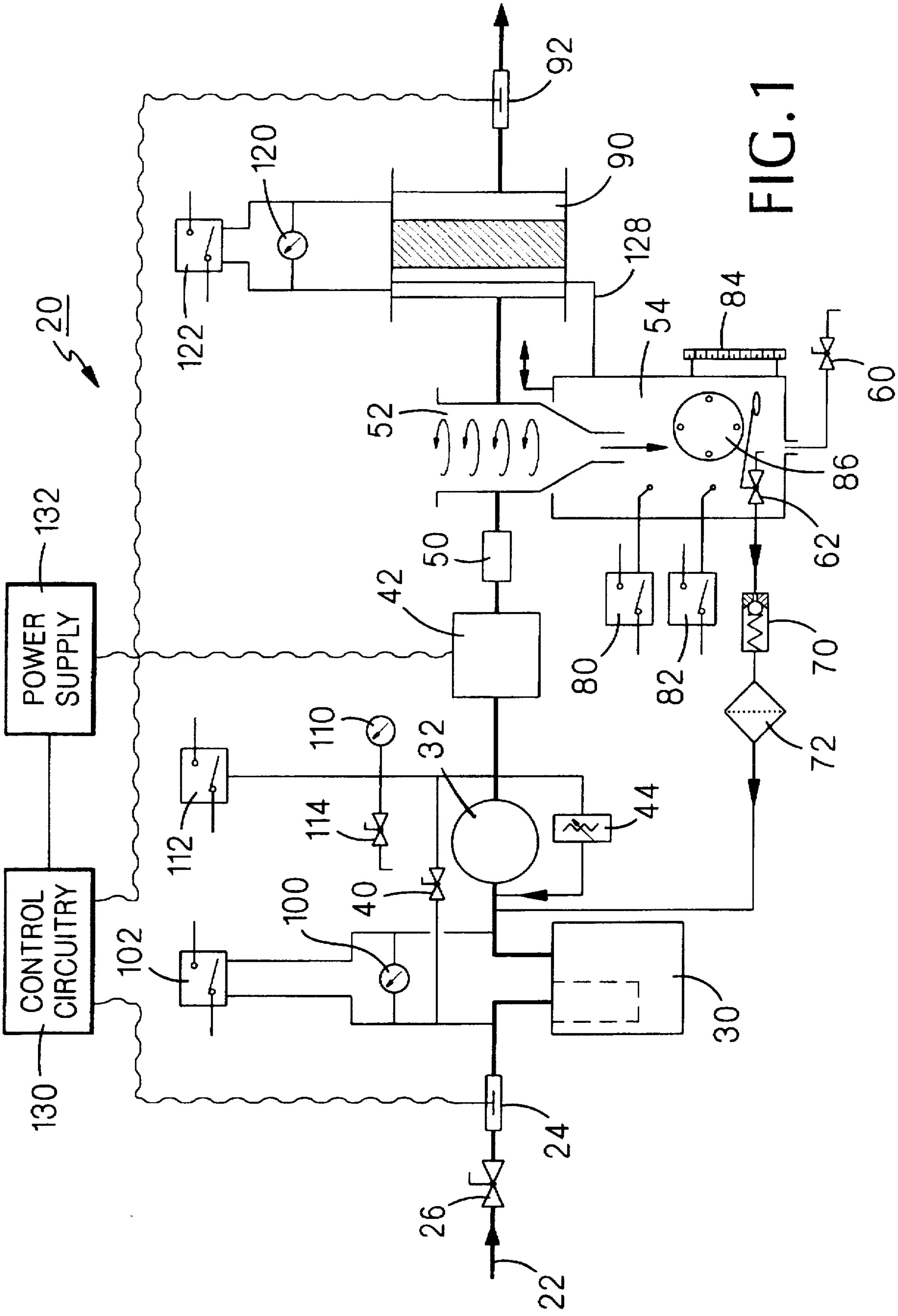
FIG. 1 is a schematic flow diagram of a purification system constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a purification system constructed according to the present invention, generally indicated by the reference numeral 20. An oil inlet 22 is connected to a first charge sensor 24 through a manual shutoff valve 26. Charge sensor 24 is connected to an inlet strainer 30 the outlet of which is connected to the suction side of a gear pump 32. The discharge side of gear pump 32 is connected to the inlet of inlet strainer 30 through a manual bypass valve 40 and to a charging chamber 42. The discharge of gear pump 32 is also connected to the suction side of the gear pump through a pressure relief valve 44. The outlet of charging chamber 42 is connected to a mixing chamber 50 which is connected to the inlet of a liquid-solid cyclone, or hydroclone, 52, the underflow of which passes downwardly into a vented storage reservoir 54.

Storage reservoir 54 has a manual water drain through valve 60 at the bottom thereof and a liquid recirculation controlled by a float-type valve 62 having its inlet somewhat above the bottom of the reservoir. Valve 62 is connected to the suction side of gear pump 32 through a check valve 70 and a first filter 72. Storage reservoir 54 includes two electrical level indicators 80 and 82, a visual level gauge 84, and a normally closed clean-out port 86.

The overflow of liquid-solid cyclone 52 is connected to a second filter 90 the outlet of which filter is connected to the outlet of system 20 through a second charge sensor 92.

Inlet strainer 30 has connected across its inlet and outlet visual and electrical differential pressure indicators 100 and 102, respectively to indicate when the inlet strainer must be cleaned or changed. Gear pump 32 has connected to its discharge side visual and electrical pressure indicators 110 and 112, respectively, to indicate system problems, and a sample valve 114. Second filter 90 has connected across its inlet and outlet visual and electrical differential pressure indicators 120 and 122, respectively, to indicate when the second filter must be cleaned or changed. Air in second filter 90 is vented to storage reservoir 54 through a vent line 128.

Control circuitry 130 is connected to first and second charge sensors 24 and 92, to other electrical components of system 20 for conventional purposes, and is also connected to control a power supply 132. The power output of power supply 132 is connected to charging chamber 42.

Where dimensions or other design parameters are given for components of system 20 in the following discussion of the operation of the system, the system is designed for a nominal flow rate of about 300 GPH, with water extraction of about 3 GPH maximum, a liquid temperature of about 40 to about 200 degrees Fahrenheit, and a liquid viscosity of about 5 to about 550 SUS nominal. Electrical power requirements are 115 VAC, single phase, 30-ampere service; about 1200 watts power draw. Sizing of components for different parameters can easily be accomplished by those skilled in the art using the teachings of the present invention.

In a typical installation, system 20 will be connected on a continuous or intermittent basis to equipment and/or to a storage reservoir (neither shown) such that nonconductive liquid in the equipment and/or the reservoir will be continuously circulated and recirculated through the system, with the liquid becoming cleaner and cleaner as the number of circulations increases.

In operation, a nonconductive liquid, such as one of the oils described above, contaminated with solid particulate matter, with or without some water or other conductive liquid, enters system 20 at inlet 22 and passes through manual shutoff valve 22. The oil then passes through first charge sensor 24 which senses the net charge of the particles in the oil and then passes through inlet strainer 30 which removes larger contaminants 20 microns and greater in size which might be harmful to gear pump 32. Inlet strainer 30 is preferably of the spin-on cartridge type and is sized to handle the liquid at design flow rate with a differential pressure drop of less than or equal to 1 PSI when clean. Gear pump 32 provides the motive force for moving the oil through system 20.

The oil then passes through charging chamber 42 where, in response to the output of first sensor 24 and under the control of control circuitry 130, power supply 132 adds a variable unbalanced bipolar charge directly and indirectly to a large percentage of the particulate population in such a manner that the outflow is opposite in net charge to the incoming liquid, and slightly lower in magnitude of charge. The objective of this unbalanced charging is to eliminate the net charge in the equipment and/or storage reservoir as quickly as possible. A biased medium-frequency alternating waveform is used which insures that the predominate distribution of charge transferred is transferred to the smallest particles.

Two mechanisms are used to accomplish this charge transfer. First, electrodes (not shown on FIG. 1, but described below) in charging chamber 42 are elevated to a potential much higher than would be required if initial charge distribution were non-preferentially accepted by all sizes of particles. This leaves a population of particles in the 0.5 to 5.0 micron size with extremely high charge. Second, the alternating electrical field with extremely high dv/dt creates a radically changing magnetic flux which preferentially causes these particles to gyrate in a region 20–50 microns from their normal positions. This mechanism is responsible for capacitively charging hundreds of smaller particles which pass near to the charged particles at a distance of less than the differential charge divided by the dielectric breakdown in effect for that distance.

This can readily be determined, since industrial insulating liquids (oils, for example) have a dielectric breakdown of 4,000 to 24,000 volts per millimeter, the dielectric breakdown in the micron range would be 4–24 volts per micron. By charging particles to between 10 and 60 KV, it is apparent that this dielectric breakdown is easily exceeded with an approach as close as 10–50 microns. Since the bulk of the contamination of most liquids is in the range of 0.001 to 1.0 micron in diameter, even an extraordinary population of these small particles constitute a minimal contamination; therefore, theses small particles will be swept near the larger supercharged particles as they traverse a small distance at relatively high speeds.

The oil then passes through mixing chamber 50 where there is self-discharge of oppositely charged particles, one to the other, to form much larger masses, typically 1–50 microns in size. Mixing chamber 42 may be a separate component or may simply be a section of connecting pipe. In either case, the residence time in mixing chamber 50 should be at least thirty seconds and is preferably at least one minute.

Following mixing, the oil passes to liquid-solid cyclone, or hydroclone, 52, or other gravimetric separator, of conventional construction where the particles in the oil are subjected to accelerated removal. The pressure in system 20 and the design of liquid-solid cyclone 52 are such that the wall pressure near the inlet of the cyclone is about 15 PSI, while the pressure near the bottom of the cyclone is about 5 PSI. Underflow from cyclone 52 is controlled by an annular orifice which has an opening of about 0.005 inch which orifice may be enlarged for higher viscosity liquids.

The underflow from hydroclone 52 containing a high percentage of the precipitated material, typically 98 percent of the precipitated solids, and a very small amount of the liquid, typically 1–3 percent of the main flow, is fed into a storage reservoir 54 where the particles are allowed to grow even larger and predominantly separate from the liquid by gravity. Any water extracted by passage through hydroclone 52 is permitted to settle out in the bottom of storage reservoir 54 and is periodically manually removed through valve 60. As liquid is recirculated through system 20 and the quality of the liquid is improved, more and more water will be removed until an equilibrium is reached as dictated by the vapor pressure of the moisture, the solubility of water in the liquid, and the strength of the interfacial tension. Accumulated solids in the bottom of storage reservoir 54 are periodically manually removed through cleanout port 86.

The level in storage reservoir 54 is controlled by valve 62. This outflow is fed through first filter 72 to remove any particles 20 microns in size or larger, which did not settle out in storage reservoir 54, flows and from the filter to the suction side of gear pump 32. Level indicator 82 provides a signal indicating that the pressure drop across first filter 72 is high and, therefore, the first filter needs to be cleaned or changed. Level indicator 80 provides a high level shutoff signal if a components should fail and cause the liquid level in storage reservoir 54 to rise to a high level.

The superannate, or overflow, from hydroclone 52 is directed through second filter 90, at a very low flux rate, where particles larger than about 5 microns are removed. Second filter 90 provides a tortuous flow path for the liquid through an electrically insulating material which will attract statically electrically charged materials. Type of filter media and design specifications for second filter 90 depend on the particles to be removed and the characteristics of the liquid.

The final step is at the outflow from system 20 where second charge sensor 92 measures the charge of the outgoing liquid. The output from second charge sensor 92 in conjunction with control circuitry 130 trims the bipolar voltage developed by power supply 132 to insure that desired conditions are met; namely, that the potential at second charge sensor 92 is equal to about 60–90 percent of the magnitude of, and opposite in polarity to, the potential at first charge sensor 24.

The net effect of system 20 is that the steady state unipolar nature of the incoming "soup" is quickly negated, while the suspended material is removed assiduously. As this process continues, contaminants are driven from the grounded elements of the equipment (not shown), to which system 20 is connected, back into suspension, where the system removes them. The final result is a liquid which is orders of magnitude cleaner than with conventional filtration, and the entire equipment is also scoured of extraneous deposits.

The liquid exiting system 20 contains small charged particles, typically much less than one micron in size, which carry a substantial charge as they return to the equipment to which system 20 is connected. These particles, now largely having a charge opposite to that in the equipment, act as "dirt magnets" in such a manner as to collect other, uncharged, and oppositely charged, particles within the equipment such that when they re-enter system 20, they have grown substantially in size. It is appropriate to remember that, if these particles grow to three times their size, they will contain twenty-seven times the mass of the particle which entered the equipment. These larger particles are now much more easily charged by charging chamber 42 and are much more likely to be removed by hydroclone 52. The above growth process adds very little to the physical size of the particles in the equipment, but contributes substantially to the mass of the contaminants removed by hydroclone 52. The result of this process is that the life of the cartridge in first filter 30 is positively affected, due to the fact that the particles are still much too small to be captured within the filter medium and due to the fact that a majority of these particles are preferentially removed by hydroclone 52, rather than filter 90, so the life of the latter is also extended.

All components downstream of and including charging chamber 42 must be constructed of nonconducting material or must have a nonconducting coating, such as an epoxy material.

Figure 2B:
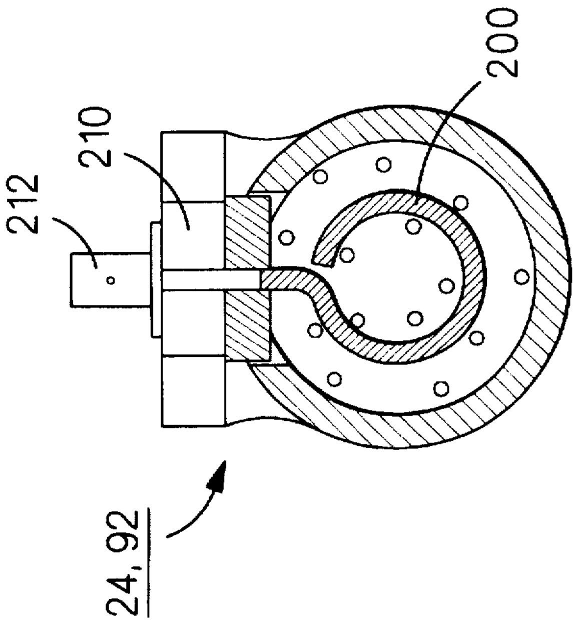
FIGS. 2A and 2B are side and end elevational views, respectively, of a charge sensor for use in the present invention.
Figure 2A:
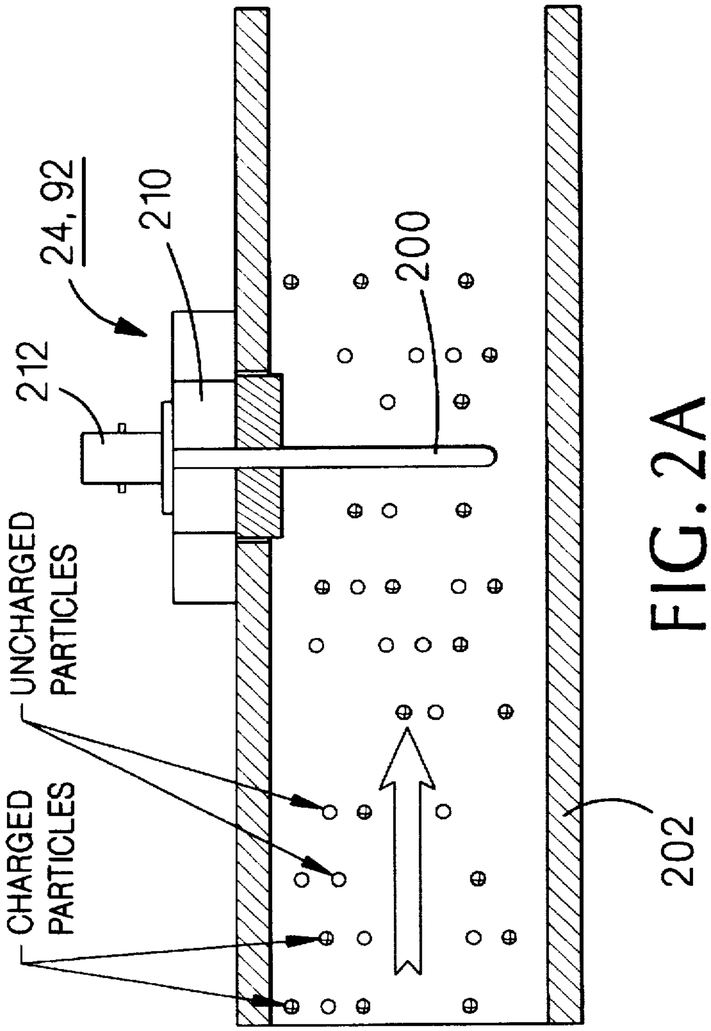

FIGS. 2A and 2B illustrate the details of construction of charge sensors 24 and 92, each of which comprise a loop of copper wire, approximately ¾-inch in diameter, disposed centrally of a conduit 202, which loop senses the net charge of particles in the liquid relative to earth ground. The plane of loop 200 is disposed orthogonally to the central axis of conduit 202 and to the flow of liquid in the conduit. Loop 200 is mounted in the wall of conduit 202 by suitable means 210 and includes an external terminal 212 for attachment to control circuitry 130 (FIG. 1).

Figure 3:
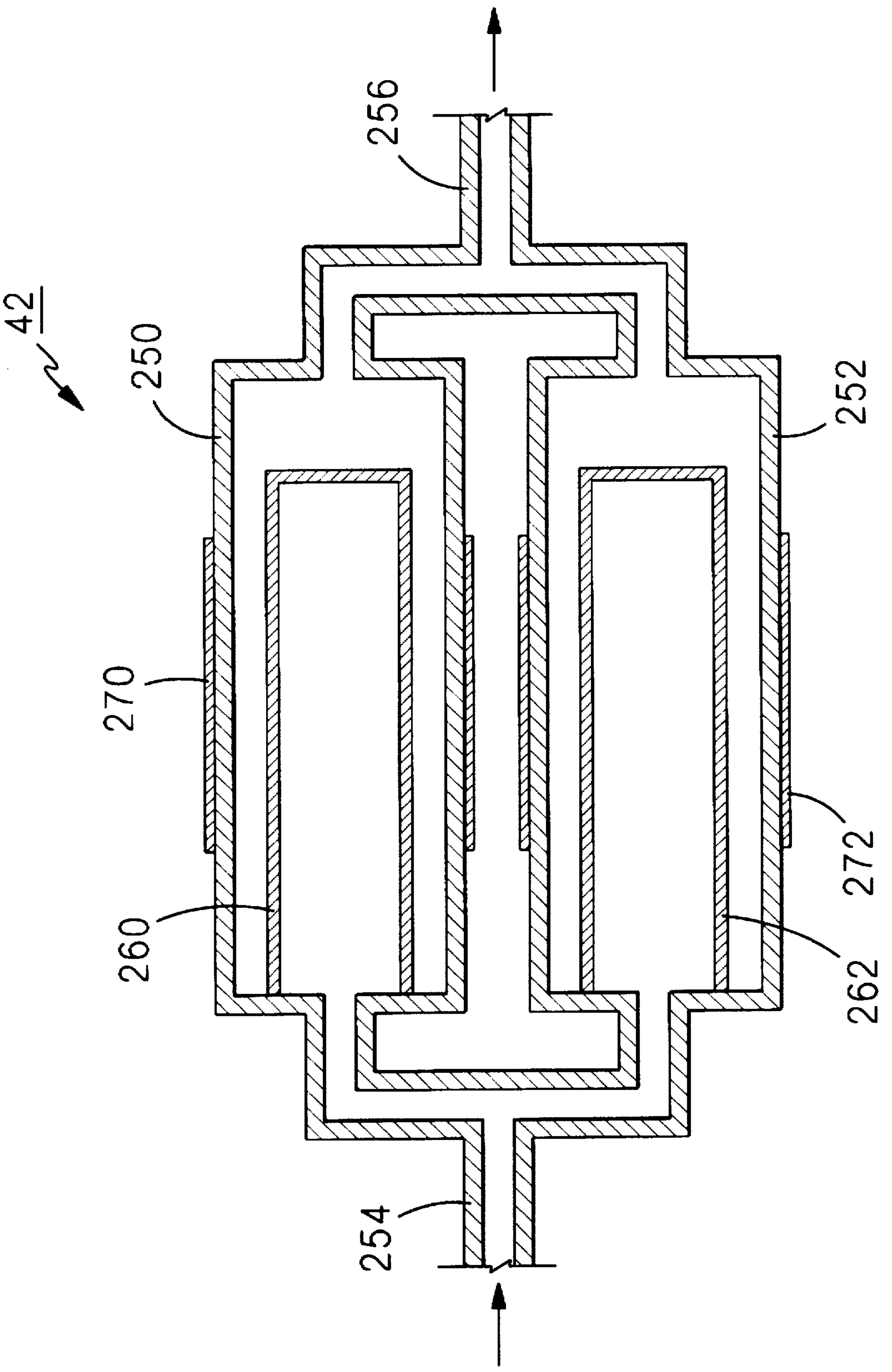
FIG. 3 is a side elevational view, in cross-section, of a charging chamber constructed according to the present invention.

FIG. 3 illustrates the details of construction of charging chamber 42. Charging chamber 42 includes upper and lower, hollow, cylindrical charging conduits 250 and 252 connected by passageways as shown to a liquid inlet 254 and a liquid outlet 256 such that the flow of liquid entering inlet 254 is divided equally between the upper and lower charging conduits and exits through outlet 256. The foregoing elements of charging chamber 42 are constructed of an extremely high dielectric material, such as ¼-inch thick polycarbonate, having a standoff voltage of about one million volts.

Disposed internally coaxially of upper and lower charging conduits 250 and 252 are, respectively, positively and negatively charged electrodes 260 and 262. Electrodes 260 and 262 are cylindrically shaped with one closed end and with the open end thereof sealingly attached around the inlets of upper and lower charging conduits 250 and 252 so that liquid entering the charging conduits must pass through the walls of the electrodes. Annularly shaped earth-grounded counter electrodes 270 and 272 are circumjacently disposed around, respectively, upper and lower charging conduits 250 and 252. Electrodes 260, 262, 270, and 272 are connected by conventional means (not shown) to power supply 132.

Electrodes 260 and 262 are approximately two inches in diameter by approximately six inches long and the walls thereof are formed of 3/16-inch-thick sintered Type 316 stainless steel particles, the walls having approximately 16–20 percent open area and forming tortuous paths therethrough having widths of approximately 50–150 microns. Thus, as particles in the liquid pass through the tortuous paths formed in the walls of electrodes 260 and 262, the particles which are large enough to contact the electrodes will be given a positive electrostatic charge as they pass through electrode 260 and a negative charge as they pass through electrode 262. Smaller particles are excluded because of boundary layer phenomena, but are capacitively charged as described above. Electrodes 260 and 262 provide nearly equipotential surfaces where the liquid exits the surfaces of those electrodes.

As noted above, charging chamber 42 is operated to positively and negatively charge particles in the incoming liquid and to counter the net charge of the particles as detected by charge sensor 24 and control circuitry 130 (FIG. 1). FIGS. 6A–6E represent oscilloscope traces of voltage applied across electrode pairs 260/270 and 262/272 of upper and lower charging conduits 250 and 252, respectively, depending on the net charge of particles in the inlet liquid. A DC voltage is applied across electrode pairs 260/270 and 262/272 from power supply 132 (FIG. 1) and both the intensity and frequency of the voltage is varied, depending on the net charge of the incoming particles.

Figure 6A:
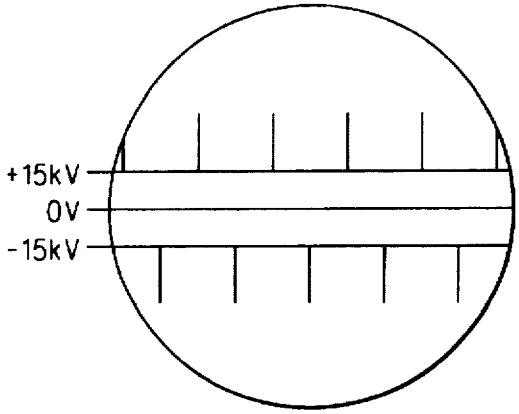
FIGS. 6A–6E represent oscilloscope traces of voltage applied to the charging chamber of the present invention as a function of net charge of particles in the inlet stream.
Figure 6B:
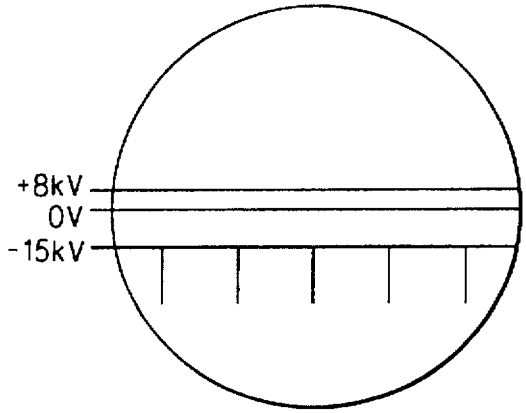
Figure 6C:
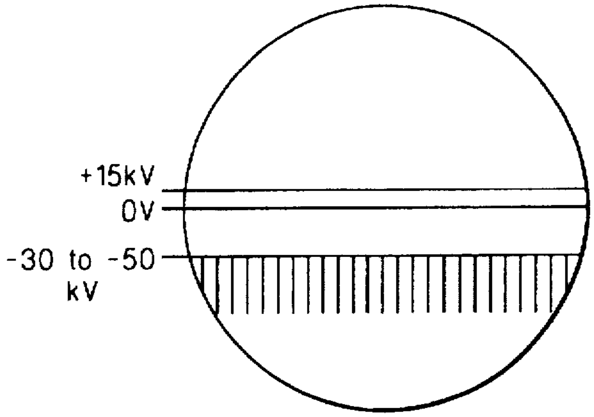
Figure 6D:
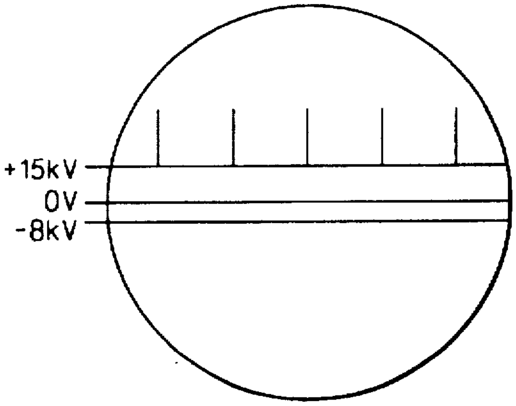
Figure 6E:
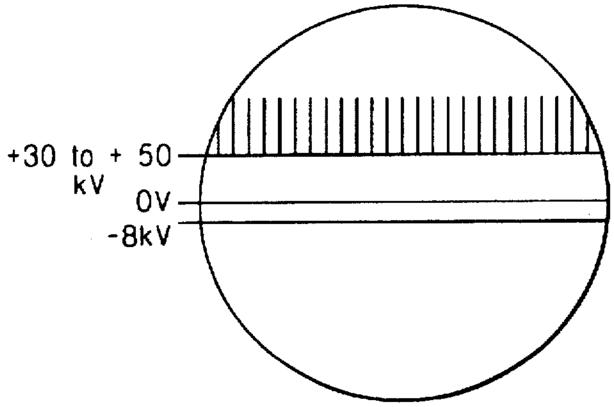

FIG. 6A illustrates a condition where there is zero voltage imbalance on the incoming charged particles. In this case, positive and negative bias voltages of approximately 15 KV are applied, respectively, across electrode pairs 260/270 and 262/272. In addition, pulses of positive and negative voltage are alternatingly applied, respectively, across electrode pairs 260/270 and 262/272. FIG. 6B illustrates a condition where there is a net positive charge imbalance on the incoming particles. Accordingly, power supply 132 is controlled to apply a positive bias voltage of approximately 8 KV across electrode pair 260/270 and a negative bias voltage of approximately −15 KV across electrode pair 262/272. In addition, pulses of negative voltage are applied across electrode pair 262/272. FIG. 6C illustrates a condition where there is an extreme net positive charge imbalance on the incoming particles. In this case, the bias potential across electrode pair 262/272 is increased to about −30 KV to −50 KV, depending on the resistivity of the liquid, and the frequency of the pulses is likewise increased. FIGS. 6D and 6E illustrate conditions where there is a negative imbalance and an extreme negative imbalance, respectively, on the incoming particles. The frequency of the pulses ranges from about 200 HZ to about 2000 HZ and the potential of the pulses, in addition to the bias voltages, ranges from about 15 KV to about 40 KV.

Figure 5A:
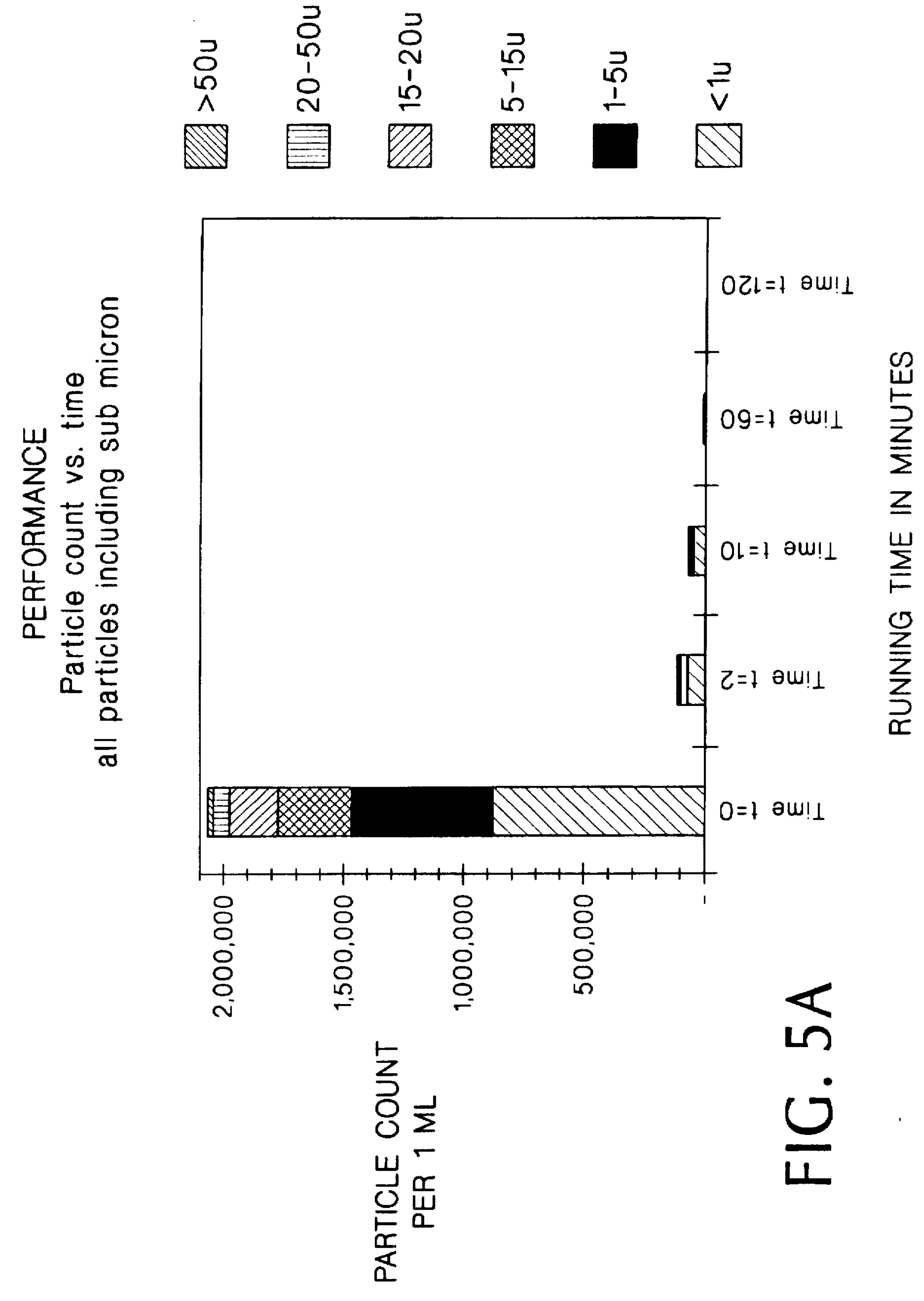
Figure 5B:
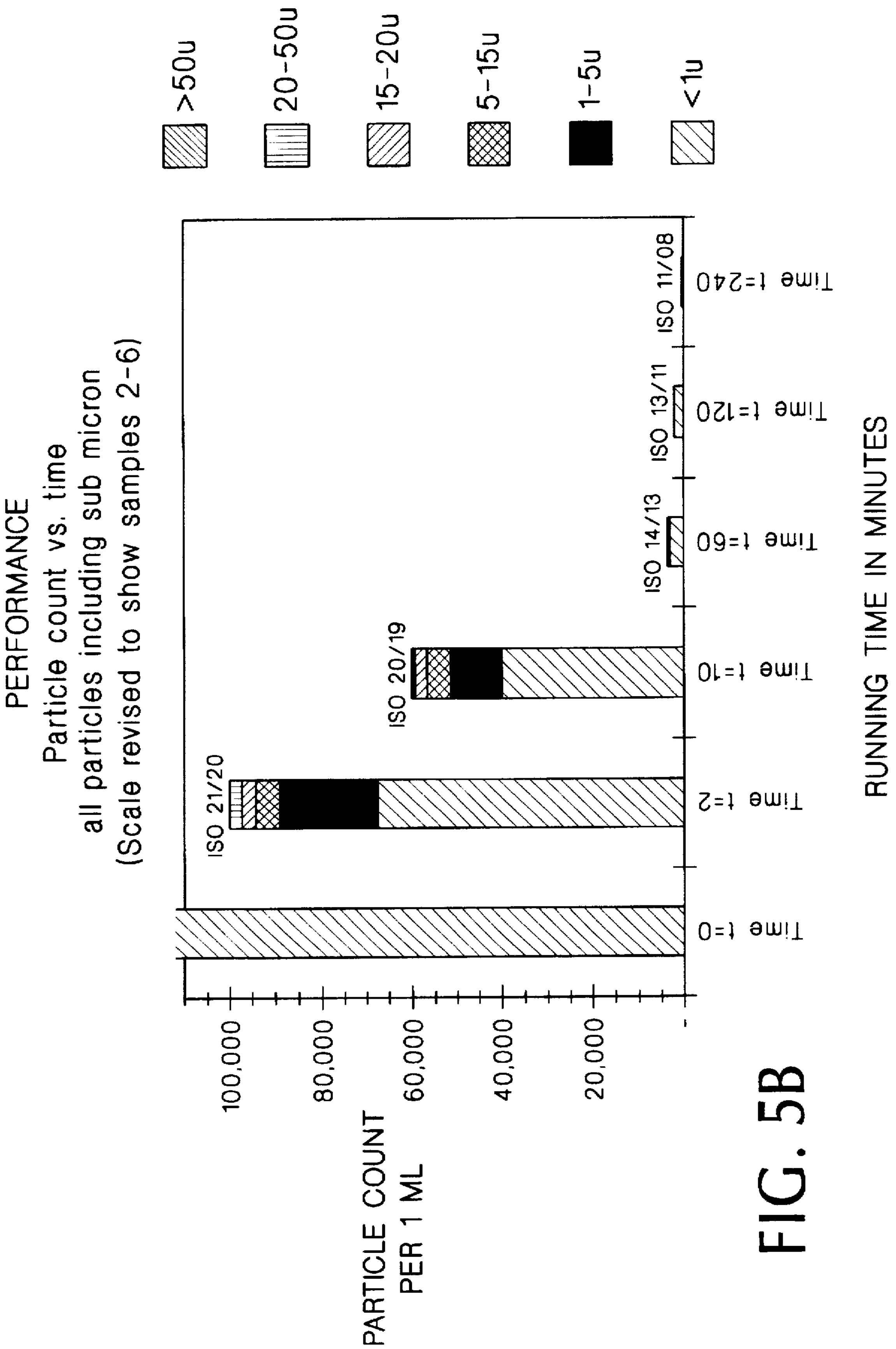

FIGS. 4, 5A, and 5B present data from a laboratory test of the present invention, with FIG. 4 comprising a table of time versus particle count of particles of various size ranges, as used to clean heavily contaminated oil in a sump, and with FIGS. 5A and 5B comprising graphical presentations of the data of FIG. 4. The total time shown represents less than 50 turnovers of the volume of the sump. It can be seen that all material 0.1 to greater than 50 microns in size is aggressively removed. It is also to be noted that material in the range of 0.1 to 1.0 micron in size (the lowest band on FIGS. 5A and 5B is removed as aggressively as material in the third through the sixth bands, the latter bands being those which are normally the only ranges reported in tests of oil cleaning systems.

FIG. 7 is a table indicating capacities of operating machinery that a system 20 sized according to the above parameters and operated continuously on stream can maintain in clean condition, as a function of oil type. The volumes shown must be reduced accordingly if the influx of contaminants exceeds the anticipated level of one gram per gallon per week. Each application is rated based on a standard level of cleanliness required for that application and the given ingress of contamination. It is also assumed that the original manufacturer's filtration equipment, if any, is left in place to continue the previous filtration schedule.

While the unit is most effective when used on stream, connected to the reservoir of a machine using the oil and continuously cleaning the oil in the reservoir, the unit may also be moved to a remote location to clean waste oil in storage at that location.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An apparatus for removing particles from a nonconductive liquid, comprising:

(a) first sensing means to sense a first net electrostatic charge on said particles in said liquid and to provide a first output signal indicative of said first net electrostatic charge;

(b) control and power means to receive said first output signal;

(c) charging means connected to said control and power means to provide positive and negative electrostatic charging potentials to said particles;

(d) mixing means connected to said charging means to receive said liquid therefrom and to permit oppositely charged and noncharged ones of said particles to flocculate; and (e) separating means to remove flocculated said particles from said liquid.

2. An apparatus, as defined in claim 1, further comprising: second sensing means to sense a second net electrostatic charge on any said particles in said liquid exiting said separating means, to provide a second output signal indicative of said second net electrostatic charge, and to provide said second output signal to said control and power means.

3. An apparatus, as defined in claim 2, wherein: said charging means provides said charging potentials such that said second net electrostatic charge is opposite in polarity to said first net electrostatic charge.

4. An apparatus, as defined in claim 3, wherein: said second net electrostatic charge has a magnitude in the range of from about 60 percent to about 90 percent of the magnitude of said first net electrostatic charge.

5. An apparatus, as defined in claim 1, further comprising: a filter connected to receive said liquid from said separating means to remove ones of said particles unremoved by said separating means.

6. An apparatus, as defined in claim 1, wherein said charging means comprises:

(a) first and second charging conduits arranged such that each of said charging conduits receives a portion of a flow of said nonconductive liquid; and (b) a first, positively charged electrode disposed internally of said first charging conduit and a second, negatively charged electrode disposed internally of said second charging conduit.

7. An apparatus, as defined in claim 6, wherein: walls of each of said first and second electrodes are formed of sintered metal particles and said nonconductive liquid flows through said walls.

8. An apparatus, as defined in claim 7, wherein: said walls are approximately three-sixteenth-inch in thickness, with approximately 16–20 percent open area, and define tortuous liquid flow paths having widths in the range of approximately 50 to 150 microns.

9. An apparatus, as defined in claim 6, wherein:

(a) said first and second charging conduits are formed of high dielectric material; and (b) first and second grounded counter electrodes are disposed, respectively, externally of said first and second charging conduits.

10. A method of removing particles from a nonconductive liquid, comprising:

(a) sensing a first net electrostatic charge on said particles in said liquid and providing a first output signal indicative of said first net electrostatic charge;

(b) in response to said first output signal, providing positive and negative electrostatic charging potentials to said particles;

(d) permitting oppositely charged and noncharged ones of said particles to flocculate; and (e) separating flocculated said particles from said liquid.

11. A method, as defined in claim 10, further comprising: sensing a second net electrostatic charge on any said particles in said liquid unseparated from said liquid, providing a second output signal indicative of said second net electrostatic charge, and providing said electrostatic charging potentials also in response to said second output signal.

12. A method, as defined in claim 11, further comprising: providing said charging potentials such that said second net electrostatic charge is opposite in polarity to said first net electrostatic charge.

13. A method, as defined in claim 12, further comprising: providing said charging potentials such that said second net electrostatic charge has a magnitude in the range of from about 60 percent to about 90 percent of the magnitude of said first net electrostatic charge.

14. A method, as defined in claim 10, further comprising: filtering said liquid to remove ones of said particles unremoved by said step of separating.

15. A method, as defined in claim 10, wherein the step of providing said charging potentials includes charging said particles in charging means comprising:

(a) first and second charging conduits arranged such that each of said charging conduits receives a portion of a flow of said nonconductive liquid; and (b) a first, positively charged electrode disposed internally of said first charging conduit and a second, negatively charged electrode disposed internally of said second charging conduit.

16. A method, as defined in claim 15, further comprising: providing walls of each of said first and second electrodes formed of sintered metal particles and said nonconductive liquid flows through said walls.

17. A method, as defined in claim 16, further comprising: providing said walls approximately three-sixteenth-inch in thickness, with approximately 16–20 percent open area, and said open area defining tortuous liquid flow paths having widths in the range of approximately 50 to 150 microns.

18. A method, as defined in claim 15, further comprising:

(a) providing said first and second charging conduits formed of high dielectric material; and (b) providing first and second grounded counter electrodes disposed, respectively, externally of said first and second charging conduits.

* * * * *